No. 614,404. Patented Nov. 15, 1898.
M. MARTIN.
SIGNALING APPARATUS.
(Application filed Sept. 28, 1885.)
(No Model.)
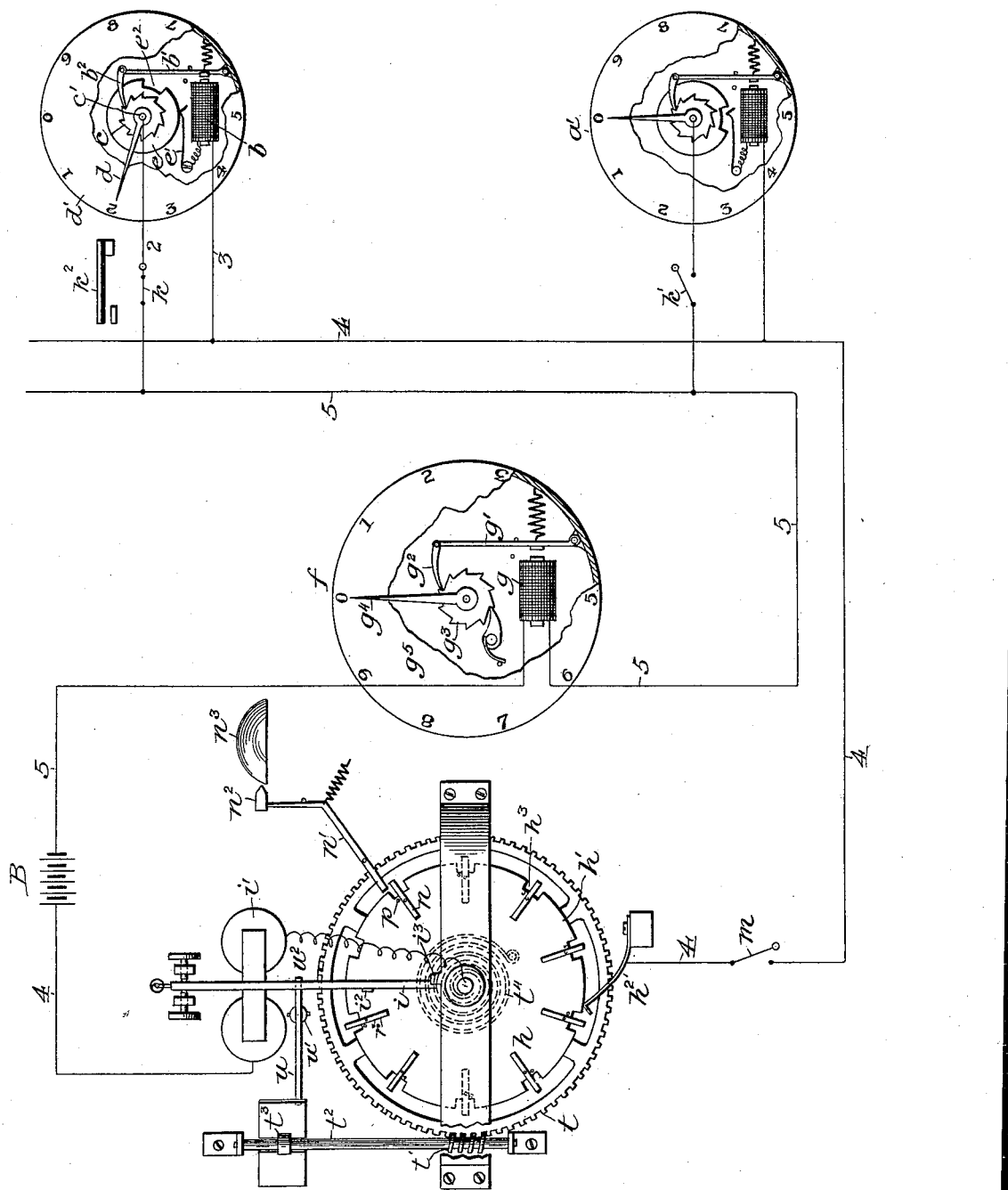
Witnesses:
Inventor:
Morris Martin
by Marcellus Bailey
his attorney

UNITED STATES PATENT OFFICE.

MORRIS MARTIN, OF MALDEN, MASSACHUSETTS, ASSIGNOR, BY MESNE ASSIGNMENTS, TO F. BENEDICT HERZOG, OF NEW YORK, N. Y.

SIGNALING APPARATUS.

SPECIFICATION forming part of Letters Patent No. 614,404, dated November 15, 1898.

Application filed September 28, 1885. Serial No. 178,453. (No model.)

*To all whom it may concern:*

Be it known that I, MORRIS MARTIN, of Malden, county of Middlesex, State of Massachusetts, have invented an Improvement in Signaling Apparatus, of which the following description, in connection with the accompanying drawing, is a specification, like letters and numerals on the drawing representing like parts.

My invention relates to an apparatus by means of which a signal the nature of which is controlled or determined at one point or station may be reproduced or made known at another point or station at any subsequent time, the transmission or act of reproducing the signal being capable of being effected from any point in the circuit connecting the two stations.

The apparatus comprises a signal-determining instrument which during the transmission of the signal has a definite movement and at some point in its movement opens the circuit or produces a change in the condition of the current by which its own further movement is arrested. In this embodiment of my invention the signal-determining device has the well-known step-by-step movement produced by a series of interruptions in the current, and at the end of a predetermined movement or number of steps it opens the circuit, thus totally stopping the current for the time being and preventing its further movement. The step-by-step device may be set or its position predetermined by an operator, so that it will require any desired number of step movements within a certain maximum number to bring it to the position where it opens the circuit. It will be readily understood that any other instrument having a movement synchronous with that of the receiving instrument—such, for instance, as another step-by-step device of similar construction included in the same circuit—will have the same amount or number of movements as the signal-determining device and will be arrested simultaneously therewith, and may consequently be used to indicate the position at which the device of the signal-determining instrument was set or the number of movements which take place in the signal-determining instrument before it automatically stops the operation of both instruments. Such an additional step-by-step device constitutes the signal-reproducing instrument, and the step-by-step devices are provided with pointers coöperating with dials having marks or signals indicated thereon, the said marks being arranged in inverse order on the dial of the signal determining and receiving instruments, so that the number of movements required to bring the pointer of the determining instrument from any given point to the normal or zero point will cause the pointer of the receiving instrument to move from the normal or zero point to the signal corresponding with that at which the pointer of the indicating instrument was set. By applying an intermittent or interrupted current for producing the step-by-step movement at any time after the indicating instrument is set the receiving instrument will be set in the position corresponding to that from which the indicating instrument started, and such interrupted current might be applied to the circuit by any convenient means and at any desired point. As herein shown, a break-wheel or current-interrupter is included in the circuit near the receiving instrument, and the apparatus also includes means by which an audible signal or gong is operated, producing a number of blows depending upon the number of step movements determined by the signal-determining instrument, the mechanical signal or bell striker remaining in operation and repeating the number-signal indefinitely after the current has ceased to act.

The drawing shows in diagram an electric circuit with signaling apparatus embodying this invention.

As shown in this instance, there may be any desired number of signal indicating or determining instruments $a\ a'$ placed in independent normally open branches 2 3 of the main circuit 4 5, which passes through the signal-receiving instrument and may include a current-interrupter. Each of the signal indicating or determining instruments $a$ comprises an electromagnet $b$ and armature $b$ therefor, the lever of which is provided with a pawl $b^2$, engaging a ratchet $c$ on an arbor $c'$, which thus receives a step-by-step rotary movement as the said armature vibrates under the alternating forces of attraction of its magnet and its retractor in the usual manner. The arbor $c'$ is provided with a pointer $d$, coöperating with a dial $d'$, having divisions corresponding to the teeth of the ratchet $c$, so that the said pointer passes from one division to another at each step movement, and the said arbor is also provided with a circuit-controlling device or switch consisting of a disk $e$ and corresponding contact-spring $e'$, the disk having a notch or insulated space $e^2$, which is opposite the spring $e'$ when the pointer is at "0" or at its normal position, the said circuit-controlling device $e$ $e'$ being in the branch circuit 2 3, including the magnet $b$ and connected with the main circuit 4 5. The said switches thus control the circuit for the current by which they are themselves actuated or controlled, placing the said circuit in one condition when in their normal position or at the zero-point and in another condition when in any other position.

When the pointer $d$ is moved away from the normal position, the branch 2 3 is closed at $e$ $e'$, and then when the magnet $b$ is affected by a series of impulses the said pointer will be moved with a step-by-step movement until, at the end of a definite number of movements determined by the position at which it was set, it arrives at the normal position, at which it causes the branch circuit to be opened at $e$ $e'$, and thus not only stops its own operation, but prevents any further impulses from being applied in the entire circuit of which the said branch forms a part, so that any other synchronously-moving or step-by-step instrument controlled by the said circuit will move the same amount or make the same number of step movements and then stop, and consequently such an instrument may be used to make known the position at which the pointer of the indicating instrument $a$ was set, or, in other words, to receive the signal determined by the said indicating instrument. Such a receiving instrument is shown at $f$ and is substantially like the instrument $a$, except that it has no circuit-closer $e$ $e'$, its magnet $g$ being constantly in the main circuit 4 5 and having an armature $g'$, the lever of which has a pawl $g^2$ coöperating with a ratchet $g^3$, the arbor of which carries a pointer $g^4$, coöperating with a dial $g^5$, the divisions of which are marked to correspond with those of the dial $d'$, but has the marks arranged in inverse order with relation to the direction of rotation of the pointer. As shown, the pointers both turn from right to left, (opposite to the hands of a watch,) and the signals or signs marked thereon are numerical, being arranged numerically in the same direction as the movement of the pointer in the instruments $a$ $a'$ and in the opposite direction to the movement of the pointer in the instrument $f$. The pointers might, however, be arranged to turn in opposite directions, in which case the signals would be in the same direction in the two instruments.

The pointer of the instrument $f$ is normally set at "0," and in either arrangement the number of movements required to bring the pointer $d$ to the zero-point will place the pointer $g^4$ opposite the figure from which the pointer $d$ began its movement. For instance, the pointer of the instrument $a$ is set at "2," and in turning in the direction of the arrangement of the figures it will require eight movements to bring it to the zero-point or normal position, and eight simultaneous movements of the pointer $g^4$ in the same direction will bring it opposite the figure "2" on the dial $g^5$, where it will stop, and will thus indicate the point at which the pointer $d$ was set by the operator before the movement began. The receiving instrument is thus actuated or controlled by the same current that actuates or controls and is controlled by the indicating or determining instrument, but the receiving instrument itself has no control over the said circuit or current.

In order to produce the simultaneous step movement of the pointers $d$ and $g^4$, it is necessary to send a number of impulses through the magnets $g$ and $b$, which may be done by opening and closing the main circuit at any desired point, it being understood that the said circuit includes a battery B or other source of electrical energy, or any other means may be employed for producing intermittent impulses in the magnets $b$ and $g$. As shown in this instance, these impulses are produced by a break-wheel $h$, having a series of teeth or projections $h'$, connected with the main circuit, and a corresponding contact-spring $h^2$, which completes the main circuit when touching the projections $h'$, but breaks the said circuit when the notches $h^3$ between the said projections pass the said spring $h^2$. This break-wheel may be actuated by any suitable motor or wheelwork and is shown as normally arrested by a detent controlled by the armature-lever $i$ of a detent or releasing magnet $i'$, included in the main circuit. When the circuit is once closed, the magnet $i'$ is energized, causing the release of the motor of the break-wheel $h$, which will thus produce at the spring $h^2$ a series of breaks, which should be as many as the maximum number of step movements required to bring the pointer $d$ of the instrument $a$ from any position to the zero-point, and the said break-wheel in revolving and producing such series of breaks causes the pointers $d$ and $g^4$ to advance with simultaneous step movements until the pointer $d$ arrives at the zero-point, when by breaking the circuit at $e$ $e'$ it prevents any further impulses from affecting the magnets $b$, $g$, and $i'$, and consequently arrests both step-by-step movements, leaving the pointer $g^4$ at the signal corresponding with the one at which the pointer $d$ was set before the movement took place.

It will be seen that an operator at each indicating instrument $a$ $a'$ can determine a signal the transmission of which to the instrument $f$ may be caused to take place at any desired time and from any desired point on the circuit.

Instead of having the interrupter $h$ started automatically by the closing of the circuit it might be released or operated by an attendant whenever it is desired to receive on the instrument $f$ a signal which might be previously set at one of the instruments $a$ $a'$ or to find out if any of the instruments $a$ $a'$ had been moved at all from their normal positions. When the interrupter $h$ is to be released automatically, as shown, the branches 2 3 should be provided with a circuit-closer or switch $k$ $k'$, which should be normally open, so that the first movement of the pointer $d$ would not close the circuit and set the interrupter in operation; but after the said pointer $d$ has been placed at the desired point, as shown in the instrument $a$, the corresponding switch, as $k$, should be closed, when, if the circuit is otherwise complete, the interrupter $h$ will at once be set in operation and the signal transmitted or rather reproduced at the instrument $f$, as before described. If, however, the operator at the instrument $f$ does not want to have the signal transmitted at once, the main circuit may be left open by the switch $m$, and the instrument $a$ will then remain in the position set until the said switch $m$ is closed, when the signal will be at once reproduced at the instrument $f$. A signaling apparatus of this character may be used for various purposes. For instance, the pointers of the instruments $a$ $a'$ may be normally set at different positions, the numbers indicating different localities at which the switches $k$ $k'$ are placed, and the said switches may be automatic in operation, indicating some change of condition, being, for instance, thermostats, or indicating a rise in temperature, so that when one of the said switches automatically closes the signal corresponding to that indicated by the instrument in the branch containing the said switch is reproduced on the instrument $f$, thus showing where such switch has been operated or where a fire has broken out. One form of thermostat is indicated by $k^2$ on the drawing. When thus used as a thermostatic fire-alarm apparatus, it may also be caused to produce an audible signal corresponding with the visual signal indicated by the instrument $f$. For this purpose the interrupter $h$ is provided with a series of strikers or buttons $n$, pivoted so that they may be turned from a substantially radial position, as shown, to a substantially tangential position, their outer ends when in the radial position being adapted to trip the lever $n'$ of the bell-hammer $n^2$, causing it to strike a blow on the bell $n^3$ as each button passes, the buttons being prevented from turning under the resistance of the lever $n'$ by stop-pins $p$. The lever $i$ of the armature of the magnet $i'$ is provided with a finger or projection $i^2$, which when the said armature is attracted is in the path of the inner ends of the buttons $n$, so that as the disk $h$ rotates in the direction of the arrow thereon the buttons as they pass the armature-lever will be swept or turned around in the direction of the arrow $r$ until they come to a substantially tangential position, so that they will not strike the lever $n'$ in passing. The number of buttons $n$ is the same as the entire number of figures on the dials of the instruments $a$ $a'$, and their operation will be best understood by taking the particular instance or condition in which the parts are shown in the drawing. Thus the pointer $d$ being at the figure "2" when the circuit is closed the magnets will all be energized, causing one step movement of the pointers $d$ and $g^4$, bringing the former to the figure "3" and the latter to the figure "1," and the armature of the magnet $i'$ will be held in position to engage the first button $n$ as it passes, turning it so that it will not strike the lever $n'$. This first button will pass the lever $i$ before the circuit is broken between the spring $h^2$ and first notch of the interrupter-wheel $h$. Then as the first notch passes and the projection $h'$ beyond it touches the spring $h^2$ the pointers $d$ and $g^4$ will make another movement, coming to the positions "3" and "8," respectively. The armature of the magnet $i'$ will be retracted, but immediately after again attracted, so as to engage the next button $n$, turning it also aside, and this will continue until the pointer $d$ comes to the zero-point, the pointer $g^4$ to the point corresponding to that from which the pointer $d$ started—namely, "2"—and the number of buttons turned aside will be the same as the number of step movements, and the number of buttons remaining in the radial position to act on the gong will be the same as the number from which the pointer $d$ started, so that at each revolution of the disk $h$ a number-signal will be struck on the bell $n^3$ corresponding to the signal at which the instrument $a$, which controls the indications of the entire apparatus, was set before the operation of the apparatus begun.

The motor for the break-wheel or interrupter $h$ as shown in this instance comprises a worm-wheel $t$, actuated by a suitable spring $t^4$, (indicated by broken lines,) and meshing with a worm $t'$ on a shaft $t^2$, provided with a fan $t^3$, which retards or regulates the movements of the worm-wheel $t$ and interrupter $h$, connected therewith. The said fan $t^3$ is normally arrested by a detent $u$, consisting of a lever pivoted at $u'$ and having its arm $u^2$ in position to be engaged by the armature-lever $i$ of the magnet $i'$ at the first movement of the said lever produced by the attraction of the magnet, which movement will disengage the detent $u$ from the fan $t^3$, and it will remain thus disengaged during the subsequent movements of the armature-lever, so that the motor will continue to run until the power is wholly exhausted or until it is stopped by the attendant and again engaged with the detent $u$ after the armature-lever $i$ has come to rest.

The end of the lever $i$ works against a recessed shoulder or guide $i^3$, which supports it against the lateral pressure of the bell-strikers $n$ upon the projection $i^2$ of the said lever.

It is obvious that the automatic interrupter may be omitted, and the intermittent current or series of impulses for operating the instruments $a$ and $f$ may be applied by opening and closing the circuit at any point by hand, as by means of the switch $m$ or $k$, or by a suitable finger-key interposed in the circuit at any desired point.

As before stated, the invention is applicable to a variety of uses.

I claim—

1. An electric signaling apparatus comprising a signal-determining instrument containing a circuit-controlling device or switch that when in its normal position places the circuit controlled by it in one condition and when in any other position places said circuit in another condition, and an electromagnetic device controlling the movement of the said switch, included in circuit therewith by means of which the said switch is arrested by the change in the circuit taking place when it arrives at its normal position, combined with a signal receiving or reproducing instrument connected in circuit with the determining instrument and having a movement synchronous therewith and having no control of the circuit connecting said instruments, substantially as described.

2. In combination a signal-indicating instrument comprising a step-by-step device and a circuit-controlling device or switch movable with it arranged to open the circuit when the step-by-step device in its movement arrives at its normal position or zero-point, and retains the said circuit closed in all other positions of said switch, and a signal receiving or reproducing instrument comprising a step-by-step device connected in circuit and having a synchronous movement with that of the indicating instrument but itself having no control over the said circuit, and means for applying an interrupted current sufficient to move the indicating instrument from any point to its normal position, whereby the receiving instrument will be moved from its normal position a number of steps equal to that required to bring the indicating instrument to its normal position and then arrested by the opening of the circuit at the indicating instrument thus affording an indication of the position from which the indicating instrument started substantially as described.

3. An indicating and receiving instrument containing step-by-step devices having a synchronous movement the one toward and the other from a normal position, and means for arresting the movement of both when the indicating instrument arrives at its normal position; combined with a break-wheel or current-interrupter and motor therefor, a series of bell-striker-actuating devices carried by the said motor and an electromagnet in circuit with the indicating and receiving instruments and armature therefor which engages and renders inoperative a number of the striker-actuating devices dependent on the number of step movements made by the indicating and receiving instruments, substantially as described.

4. A series of signal-indicating instruments in independent branches and a circuit-controlling device forming a part of each, which is in one condition retaining the corresponding branch open when in its normal position and in the other condition or closed in all other positions, combined with a signal-receiving instrument in the main circuit connected with all the branches, having a movement synchronous with that of the indicating instrument and arrested by the circuit-controlling device of the indicating instrument when it arrives at its normal position, substantially as described.

5. The combination substantially as hereinbefore set forth, of an electric circuit and electromagnet included therein at a substation, an automatic rheotome for completing and interrupting the connections thereof at a main station; and a circuit-interrupting device at the substation normally breaking the circuit and closing the same when set and brought into action by the said electromagnet and serving to interrupt the connections of said circuit when a determinate number of interruptions and completions of the circuit have been occasioned by said rheotome, substantially as described.

6. The combination substantially as hereinbefore set forth, with a circuit completing and interrupting device at a main office, of an electromagnet for operating the same, means for completing circuit connections through said electromagnet, an indicator operated thereby and a transmitting device located at a distant point consisting of a circuit-controller normally interrupting the connections of said circuit, but capable of being placed in position to close the circuit and means for causing it to again interrupt the circuit after a number of completions and interruptions thereof have been made by the main-office controller sufficient to place the receiving indicating device in the position to designate the signal determined by the transmitting device, substantially as described.

7. In a signal-transmitting system, a signal-transmitter at one station comprising variable signal-determining devices, a receiver at a second station for reproducing the signal determined at the first station, circuit connections, and a device at the receiving-station for controlling the reception of the predetermined signal, said device being as to its time of operation, independent of the transmitter, substantially as and for the purposes hereinbefore set forth.

8. In a signal-transmitting system, a signal-transmitter at one station comprising variable signal-determining devices, a receiver at a second station for reproducing the signal determined at the first station, circuit connections comprising only one line between the two stations, and a switch included therein at the receiving-station for controlling the reception of the predetermined signal, said switch being as to its time of operation independent of the transmitter, substantially as and for the purposes hereinbefore set forth.

9. In combination, an electric circuit, a signal-transmitter comprising variable signal-determining devices, an electromagnet for controlling the operation of the same, and a switch which as to its time of operation is independent of the transmitter arranged to bring the transmitter into coöperation with the circuit after the signal has been determined, substantially as and for the purposes hereinbefore set forth.

10. In a signal-transmitter the combination of variable signal-determining devices, a circuit-closer controlled by the act of setting said devices, and an electromagnet controlling a step-by-step motor and arranged to reopen the circuit closed by said circuit-closer, after transmission of the signal for which the said signal-determining devices are set, substantially as and for the purposes hereinbefore set forth.

In testimony whereof I have signed my name to this specification in the presence of two subscribing witnesses.

MORRIS MARTIN.

Witnesses:
 JOS. P. LIVERMORE,
 H. P. BATES.